Oct. 10, 1950  W. L. O. GRAVES  2,525,451
REGULATING SYSTEM
Filed May 21, 1949

Inventor:
William L.O. Graves,
by *Charles H. Mott*
His Attorney.

Patented Oct. 10, 1950

2,525,451

UNITED STATES PATENT OFFICE 2,525,451

REGULATING SYSTEM

William L. O. Graves, Schenectady, N. Y., assignor to General Electric Company, a corporation of New York Application May 21, 1949, Serial No. 94,611

5 Claims. (Cl. 322—28)

My invention relates to regulating systems, and more particularly to regulating systems of the type which utilizes a magnetic amplifier for controlling an electrical characteristic of a dynamoelectric machine or circuit.

An object of my invention is the provision of a simple, reliable and inexpensively constructed system providing automatic regulation and having good regulating characteristics.

A further object of the invention is the provision of a regulating system having no moving parts.

In carrying out my invention in one form, I provide a voltage regulating system for an alternating current generator in which a bridge type full-wave rectifier having a magnetic amplifier in the bridge circuit is used to supply current to the excitation circuit of the generator. The rectifier furnishes unidirectional current for the excitation of the generator by acting as a controlled rectifier deriving energy from a suitable alternating current source. The magnetic amplifier includes two saturable core reactors, the load windings of which are connected respectively in two parallel branches of the bridge circuit. The control windings of the reactors are connected to a source of control voltage which is responsive to the output voltage of the alternating current generator. As the generator output voltage varies, the current in the control windings of the saturable core reactors is varied, causing the rectifier to vary the amount of excitation current to the generator, thus maintaining the generator output voltage at the desired value.

Figure 1:
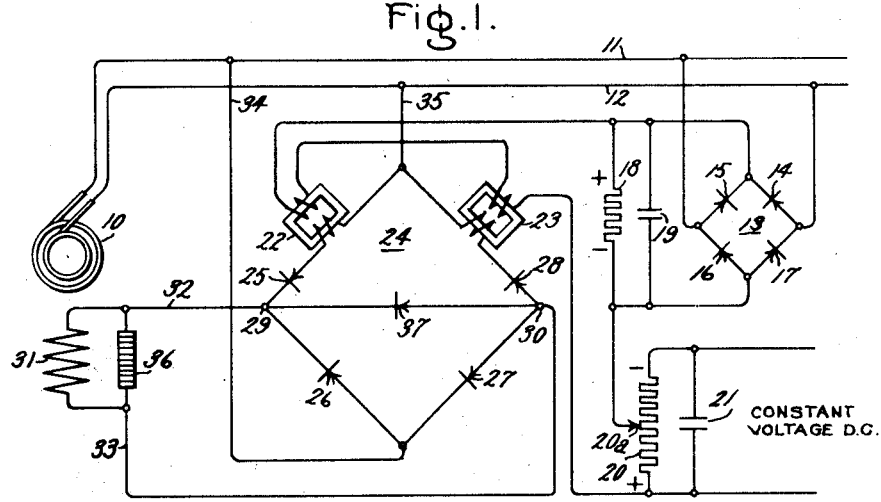
Figure 2:
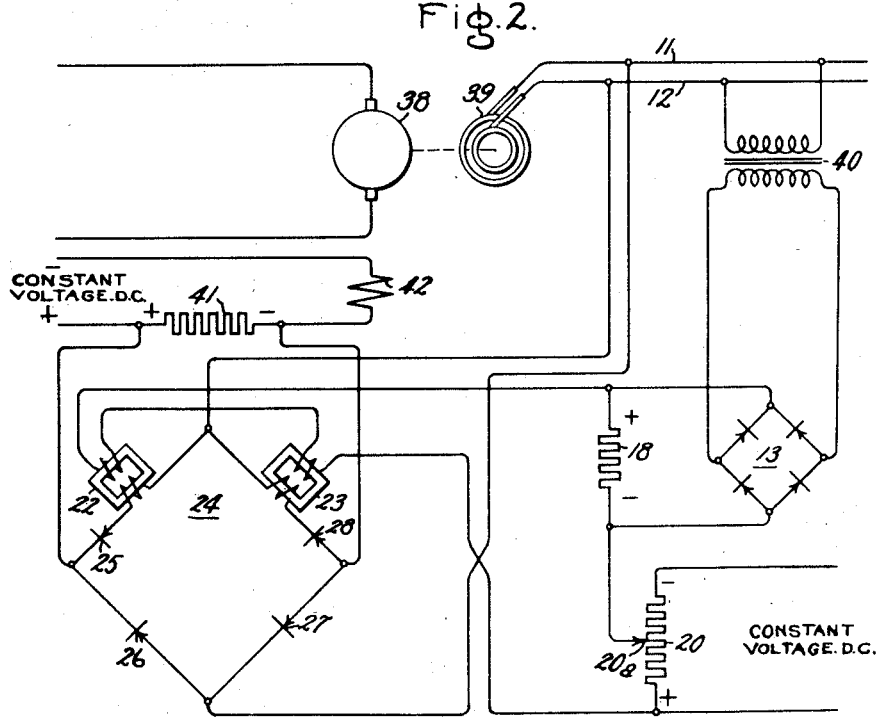

For a clearer and more complete understanding of my invention, reference should be had to the accompanying drawing, Fig. 1 of which is an electrical circuit diagram of one preferred embodiment thereof; while Fig. 2 is an electrical circuit diagram of a modified embodiment of the invention.

Referring to Fig. 1 of the drawing, I have represented by the numeral 10 an alternating current generator, the output voltage of which is to be regulated. Generator 10 may be driven by any suitable means (not shown). Generator 10 is illustrated as a single phase machine having two output terminals to which a pair of conductors 11 and 12 are connected.

In order to derive a signal voltage responsive to the output voltage of generator 10, a full-wave rectifier designated generally by the numeral 13 is connected between conductors 11 and 12. Rectifier 13 is of the conventional bridge type, comprising a pair of unidirectional conducting devices in series in one direction and a pair of unidirectional conducting devices in series in the other direction. Devices 14 and 17 form one series pair, while devices 15 and 16 form the other series pair, with the mid-point junctions of devices 14 and 15 and devices 16 and 17 forming respectively the unidirectional current output terminals of the full-wave rectifier. Devices 14-17 inclusive, are preferably of a dry type, such as copper oxide or selenium and are assumed to be all alike.

The unidirectional output voltage of rectifier 13 is impressed across a resistor 18. A capacitor 19, which is in shunt with resistor 18, acts as a filter for the unidirectional current from rectifier 13. Connected in parallel with the output signal voltage of rectifier 13 across resistor 18 is a portion of a potentiometer resistor 20 which provides an adjustable potential source to serve as a reference. A constant unidirectional voltage is impressed across potentiometer 20 which has a capacitor 21 in shunt therewith to provide a filter for voltage pulses which are reflected from the regulating system back to the constant voltage source. The potential drop between the positive terminal of resistor 20 and a sliding terminal 20a provides the reference voltage. The control windings of two saturable core reactors 22 and 23 are connected in the circuit of resistor 18 and potentiometer 20 so that the difference in potentials across resistor 18 and the active portion of potentiometer 20 causes a current to flow in these control windings. This difference in potential is the control voltage responsive to the output voltage of generator 10, which is utilized by the magnetic amplifier in regulating the generator voltage.

A bridge circuit rectifier 24, which has the load windings of saturable reactors 22 and 23 connected in two legs thereof, is used to supply excitation voltage for generator 10. Rectifier 24, in this instance, is shown connected to conductors 11 and 12 by conductors 34 and 35, respectively, to provide it with a supply of alternating current energy. However, the rectifier may be connected to any suitable source of alternating current.

Rectifier 24 is composed of four unidirectional conducting devices 25, 26, 27 and 28 connected in a bridge circuit, with the load winding of saturable core reactor 22 connected in series with rectifier 25 and the load winding of reactor 23 connected in series with rectifier 28. Devices 25-28 inclusive, are preferably of the selenium type and all four rectifiers are assumed to be alike. Rectifier 24 acts as a full-wave controlled rectifier having two unidirectional current output terminals 29 and 30. Terminals 29 and 30 are connected to the terminals of a field coil 31 which represents the excitation circuit of generator 10.

While I have illustrated the magnetic amplifier as having two separate magnetic cores, it will be readily understood that a single core having a single saturating winding and two load windings may be used. This does not change the principle of operation of the magnetic amplifier, inasmuch as the control, or saturating windings of reactors 22 and 23 in Fig. 1 are connected in series. Also, it will be understood that the magnetic core or cores need not be rectangular in form, as illustrated schematically in Fig. 1, but may have the shape of a toroid or other suitable shape.

In order to understand the operation of my regulating system, assume first that generator 10 is operating with an unvarying output voltage. Under this condition, a sufficient amount of current is rectified by rectifier 13 to create a signal voltage which maintains the current in excitation circuit 31 at a constant value corresponding to this generator voltage. Under this condition, the potential drop across resistor 18 is slightly less than the potential drop across the active portion of potentiometer 20 which is connected in parallel with resistor 18. This causes current to flow from the positive terminal of potentiometer 20 through the control windings of saturable core reactors 23 and 22, thence through resistor 18 and back to potentiometer 20 through sliding terminal 20a. This current flowing through the control windings of reactors 22 and 23 partially saturates the cores of these reactors. This saturation reduces the impedance of the reactors sufficiently that they permit the passage of enough current through rectifier 24 to maintain the current in the excitation circuit 31 at the level corresponding to the desired generator output voltage.

It will be understood that current flows through the load winding of reactor 22 and device 25 during half of each cycle of the alternating potential applied to rectifier 24, and through device 28 and the load winding of reactor 23 during alternate half cycles. Assuming that the potential of conductor 12 is positive during the first half cycle, the current will flow through a circuit comprising conductor 35, the load winding of reactor 22, unidirectional conducting device 25, a conductor 32, coil 31, a conductor 33, device 27, and thence through conductor 34 to conductor 11. During alternate half cycles when the potential of conductor 11 is positive, the flow of current is through conductor 34, device 26, conductor 32, coil 31, conductor 33, device 28, the load winding of reactor 23 and conductor 35 which is connected to conductor 12. Thus, a pulsating unidirectional current flows continuously through excitation coil 31, the magnitude of which is determined by the degree of magnetic pre-saturation of the core of reactors 22 and 23, which, in turn, is determined by current flowing in the control windings of these reactors.

In the bridge type circuit utilized for rectifier 24, harmonic voltages higher than the fundamental alternating current frequency may be present. Such harmonic voltages are caused by the interaction of the pulsating fluxes in the medium of the interconnected control windings. Therefore, a non-linear resistance device 36 is connected in shunt with coil 31. Device 36 is of a type of material which acts substantially as an insulator at normal voltages but becomes a relatively good conductor of current at voltages slightly higher than normal. Making use of this property, device 36 eliminates high voltage pulses which result from the harmonic voltage components produced by rectifier 24.

The output voltage of the rectifier 24 is pulsating and drops to zero potential twice during each cycle. Therefore, since the excitation coil 31 is inductive, which inductiveness is increased by the presence of a magnetizable core (not shown) within coil 31, the excitation coil produces a negative voltage across its terminals during the portion of the cycle when the rectifier output voltage is at or near zero. This negative voltage would cause current to flow through a path composed of unidirectional conducting devices 27 and 26, or a parallel path composed of device 28, reactor 23, reactor 22 and device 25. Devices 27 and 26, 28 and 25 have a forward resistance which is high in comparison with the impedance of the load windings of reactors 23 and 22, the forward resistances of these devices being approximately 0.6 volt per plate when selenium rectifiers are used. As a result of these comparative values of impedance, a substantial portion of the inductive kick-back current from coil 31 would pass through the path which includes the load windings of the two reactors, and this would tend to make rectifier 24 unstable. Therefore, an additional unidirectional conducting device 37, having approximately half the forward resistance of each of the devices 25-28 inclusive, is connected between terminals 30 and 29. Device 37 carries the greater portion of the inductive kick-back current from coil 31, thus insuring stability in the magnetic amplifier.

When the terminal output voltage of generator 10 drops below the desired value, the regulating system of my invention immediately functions to restore it to the original value. Such a decrease in output voltage decreases the potential between conductors 11 and 12 and reduces the potential which is applied to full-wave rectifier 13. This reduces the unidirectional output voltage of rectifier 13, thus reducing the potential drop across resistor 18. This increases the difference in potential between the signal voltage across resistor 18 and the reference voltage across potentiometer 20, causing an increased current to flow through the control windings of reactors 22 and 23. This, in turn, increases the saturation of the cores of the reactors, which permits increased current to flow through the load windings of the reactors. Thus, the output of rectifier 24 is increased, increasing the current through excitation coil 31. This, in turn, increases the excitation of generator 10 and increases the terminal voltage of the generator automatically to the desired level.

It should be understood that saturable core reactors 22 and 23 are, in part, self-saturating; that is, the control windings produce a component of flux in each which partially saturates the reactor core and thereby governs the time during the cycle when complete saturation takes place, with the balance of the saturating flux being produced by the load winding. In order to better understand this, assume for the moment that there is no flux in the reactor core at the instant source rises from the negative portion of a cycle to zero. Then, as the voltage increases and begins a positive half cycle, the current in one load winding, for example, the load winding of reactor 22, produces flux in the reactor core. This flux increases as the potential increases during the positive half cycle in a manner similar to a transformer or other similar device. During the time that the flux is increasing, before the saturation point of the core is reached, substantially all of the voltage drop between conductors 11 and 12 occurs across the load winding of reactor 22. But, as soon as the saturation point is reached, the current which is delivered in the load circuit is limited only by the air core inductance of the reactor load winding and the impedance of the load circuit. The core being saturated, there is no longer any change in flux linkages to impede the flow of current through the load winding. Therefore, the presence of the core no longer affects the reactance of the load winding.

The presence in the core during such a half cycle of flux due to the control winding serves merely to provide an initial bias for the flux due to the load winding, thereby to govern the time during the half cycle when saturation occurs. When the voltage returns to zero, the rectifier device in series with the loading winding stops the flow of current and during the next half cycle of voltage the flux returns to zero. During the next half cycle the other reactor repeats the operation just described so that current flows through one load winding or the other during a portion of each half cycle. Magnetic material having a magnetization curve with a very sharp knee is used for the cores of reactors 22 and 23. This causes the load current to rise from a negligible value to a maximum in approximately 5 electrical degrees of the alternating voltage cycle when the saturation point is reached. For the remainder of each half cycle after saturation, the load current follows approximately a sine wave. Thus, the magnetic amplifier composed of reactors 22 and 23 has current characteristics very similar to those of a thyratron type electron discharge device, which produces a pulsating unidirectional current in coil 31 in the output circuit of rectifier 24.

When an increase in the terminal voltage of generator 10 occurs, the regulating system functions in the opposite manner to that previously described to reduce the excitation of the generator and restore the terminal voltage to the original value. In this case, rectifier 13 increases the potential drop across resistor 18, which decreases the control voltage, the control voltage being the difference in potential between the signal voltage across resistor 18 and the reference voltage across the active portion of potentiometer 20. The reduced control voltage decreases the current in the control windings of reactors 22 and 23, thereby increasing the impedance of these reactors and decreasing the output of rectifier 24, which results in a decrease in the current through excitation circuit 31. The generator terminal voltage which the regulating system maintains is adjustable either upward or downward by moving slider 20a on potentiometer resistance 20, thereby varying the reference potential from which the control voltage is derived.

In one typical apparatus embodying my invention, in which generator 10 is a 110 volt, 8 kw., 60 cycle, single-phase machine, I have found that it is possible, using my invention, to regulate the generator output voltage within one percent of 110 volts. It will be noted that this is accomplished without moving parts in any portion of the regulating system.

A modification of my invention is illustrated in Fig. 2 on the accompanying drawing, in which the invention is embodied in a static speed regulating system for a separately excited unidirectional current motor. The motor, which is designated by the numeral 38, is illustrated driving an alternating current generator 39. The generator 39 may be either a small tachometer generator which is used only for the speed regulating system, or it may be a large generator providing power for a load circuit (not shown). In the latter case, the speed regulating system serves also as a frequency control system, inasmuch as the generator frequency varies proportionally with the speed of the motor. Like parts in Fig. 2 bear the same identifying numerals as the corresponding parts in Fig. 1.

The alternating current for full-wave rectifier 13 is taken from the output leads of generator 39 through a frequency sensitive transformer 40. The secondary voltage of transformer 40 increases as the frequency increases and decreases as the frequency decreases; therefore, the output signal voltage of rectifier 13 increases as the frequency of generator 39 increases and decreases as the generator frequency decreases. The unidirectional output voltage of rectifier 13 appears across resistor 18, which is connected in the circuit with potentiometer 20 in the same manner as in Fig. 1. The difference in potential between resistor 18 and potentiometer 20 causes current to flow in the control windings of reactors 22 and 23, which control the output of rectifier 24 in the same manner as in Fig. 1. The unidirectional output of rectifier 24 is used, in this instance, to vary the potential drop across a resistor 41 which is in series with the field excitation coil 42 of motor 38.

If the speed of motor 38 decreases, the frequency of generator 39 decreases, which decreases the secondary voltage of transformer 40. This decreases the output of rectifier 13, thus decreasing the potential across resistor 18, and increasing the control voltage which is the difference in potential drops across resistor 18 and potentiometer 20. This increases the current in the control windings of reactors 22 and 23, which increases the output of rectifier 24 and increases the potential drop across resistor 41. This decreases the potential drop across excitation coil 42, inasmuch as resistor 41 and coil 42 are connected in series across a constant voltage source of unidirectional current, thereby decreasing the current flowing through coil 42. The decrease in current through coil 42 decreases the excitation of the motor 38, causing the speed of the motor to increase until equilibrium is restored. In the event of an initial increase in the speed of motor 38, the regulating system functions in the opposite manner to that just described to increase the excitation of the motor until the speed is restored to the desired value.

While I have illustrated and described one preferred embodiment of my invention, together with one modification thereof, many additional modifications will occur to those skilled in the art. Therefore, it should be understood that I intend to cover, by the appended claims, all such modifications which fall within the true spirit and scope of my invention.

What I claim as new and desire to secure by Letters Patent of the United States is:

1. Regulating means for the excitation circuit of an alternating current generator comprising means for providing a unidirectional control voltage responsive in magnitude to variations in the alternating voltage output of said generator, a pair of saturable core reactors having control windings and load windings, said control windings being connected to said control voltage means, a source of alternating current, a bridge circuit rectifier comprising four unidirectional conducting elements connected in pairs across said source of alternating current in a manner such that the midpoints of said pairs form unidirectional current output terminals equipotential to the fundamental voltage wave of said alternating current source, the load windings of said reactors being connected respectively in two of the legs of said bridge circuit which are joined to a common terminal of said alternating current source, at least one generator field excitation coil connected between said unidirectional current terminals, a non-linear resistance device connected in shunt to said coil, and a unidirectional conducting device connected between said unidirectional current terminals for bypassing current surges resulting from the inductance of said excitation coil.

2. In a voltage regulating system for an alternating current generator, rectifier means for deriving a unidirectional signal voltage responsive to the output voltage of said generator, a unidirectional reference voltage connected in opposition to said signal votage, a self-saturating magnetic amplifier having a control winding and two load windings, said control winding being connected in circuit with said signal voltage and said reference voltage whereby a unidirectional current is caused to flow in said control winding by the difference in potential between said signal voltage and said reference voltage, and a rectifier responsive to the current in said control winding for varying the excitation of said generator to maintain the output voltage thereof at substantially a predetermined value, said rectifier comprising a bridge circuit having four unidirectional conducting devices connected in pairs across an alternating current source in a manner such that the midpoints of said pairs form unidirectional current output terminals equipotential to the fundamental wave of said alternating current, the load windings of said magnetic amplifier being connected respectively in two of the legs of said bridge circuit which are joined to a common terminal of said alternating current source whereby the unidirectional output current of said rectifier is varied responsively to the variation of current in said control winding.

3. A speed regulating system for a separately excited unidirectional current motor comprising means for deriving a unidirectional signal voltage responsive to variations in the speed of said motor, a reference voltage, a pair of saturable core reactors having control windings and load windings, said control windings being connected in circuit with said signal voltage and said reference voltage in a manner such that the current through said control windings is responsive to the difference between said signal voltage and said reference voltage whereby the saturation of said reactors and the impedance of said load windings is controlled responsively to said signal voltage, a source of alternating current energy, a full-wave bridge type rectifier comprising four unidirectional conducting devices connected in pairs across said alternating current source in a manner such that the midpoints of said pairs form unidirectional current output terminals, the load windings of said reactors being connected respectively in two of the legs of said bridge circuit which are joined to a common terminal of said alternating current source whereby the unidirectional output current of said full-wave rectifier varies responsively to the variation in impedance of said load windings, and a resistor connected between said output terminals, said resistor being connected in series in the excitation circuit of said motor whereby the excitation of said motor and the speed thereof is varied responsively to the output current of said full-wave rectifier.

4. A regulating system comprising a source of varying potential alternating current, a full-wave rectifier connected to said source, said rectifier having alternate rectified circuit portions for allowing current to pass in opposite directions therethrough from said source, and unidirectional current output terminals comprising midpoints in said parallel circuits across which there is normally zero alternating current output potential, each portion of each said parallel circuit on either side of said midpoints containing a unidirectional conducting device, a resistor connected between said midpoints, a source of unidirectional reference potential, a pair of iron cores, saturating windings on said iron cores connected to be excited by the difference between the potential drop across said resistor and said reference potential, a pair of load windings positioned respectively on said cores, a second full-wave rectifier connected to said source of alternating current, said second rectifier having alternate rectified circuit portions for allowing current to pass in opposite directions therethrough from said source, a pair of unidirectional current output terminals comprising midpoints in said parallel circuits across which there is normally zero alternating current output potential, each portion of each said parallel circuit on either side of such midpoints containing a unidirectional conducting device, and one portion of each of said parallel circuits on the same side of the midpoints thereof including one of said load windings, and an electrical load connected between said midpoints of said second full-wave rectifier, the unidirectional potential drop between said midpoints being responsive to variations in the potential of said first source of alternating current.

5. A speed regulating system for a separately excited unidirectional current motor comprising, means for providing a unidirectional control voltage responsive in magnitude to variations in the speed of said motor, a self-saturating magnetic amplifier having a control winding and two load windings, said control winding connected to be energized by said control voltage whereby unidirectional current corresponding to said control voltage is caused to flow in said control winding, a resistor serially connected in the excitation circuit of said motor, and a rectifier responsive to the current in said control winding for providing a variable current through said resistor whereby the excitation of said motor and the speed thereof is varied responsively to the output current of said rectifier as a result of the variations in the voltage drop across said resistor, said rectifier comprising a bridge circuit having four unidirectional conducting devices connected in pairs across an alternating current source in a manner such that the midpoints of said pairs form unidirectional current output terminals equipotential to the fundamental wave of said alternating current, the load windings of said magnetic amplifier being connected respectively in two of the legs of said bridge circuit which are joined to a common terminal of said alternating current source.

WILLIAM L. O. GRAVES.

REFERENCES CITED

The following references are of record in the file of this patent:

UNITED STATES PATENTS

| Number | Name | Date |
|---|---|---|
| 1,902,485 | Arkenburgh | Mar. 21, 1933 |
| 2,018,348 | Dijksterhuis | Oct. 22, 1935 |
| 2,403,891 | Lamm | July 9, 1946 |